United States Patent [19]

Mc Connell et al.

[11] 3,880,646

[45] *Apr. 29, 1975

[54] METHOD OF CONTROLLING WEEDS WITH A COMBINATION OF ISOPROPYL N-(3-CHLOROPHENYL)-CARBAMATE AND SODIUM AZIDE

[75] Inventors: William C. Mc Connell, Griffin, Ga.; Henry W. Rahn, Pittsburgh, Pa.

[73] Assignee: PPG Industries, Inc., Pittsburgh, Pa.

[ * ] Notice: The portion of the term of this patent subsequent to Nov. 13, 1990, has been disclaimed.

[22] Filed: Oct. 22, 1971

[21] Appl. No.: 191,821

Related U.S. Application Data

[60] Continuation of Ser. No. 755,765, Aug. 26, 1968, abandoned, which is a continuation of Ser. No. 632,478, Feb. 13, 1967, abandoned, which is a division of Ser. No. 400,216, Sept. 29, 1964, Pat. No. 3,376,125.

[52] U.S. Cl. .......................... 71/111; 71/83; 71/84; 71/117
[51] Int. Cl................................................ A01n 9/20
[58] Field of Search................................ 71/65, 111

[56] References Cited

UNITED STATES PATENTS

| 1,819,399 | 8/1931 | Wesenberg .......................... 71/65 X |
| 3,342,577 | 9/1967 | Blouin et al. ........................ 71/65 X |

OTHER PUBLICATIONS

Agnonomy Abstracts, 1965, page 85.

*Primary Examiner*—James O. Thomas, Jr.
*Attorney, Agent, or Firm*—Mark Levin; George D. Morris

[57] ABSTRACT

Sodium azide and an organic herbicide capable of being metabolized by soil micro-organisms are applied to the soil. The sodium azide kills the micro-organisms thereby extending the soil life of the organic herbicide. Upon decomposition of the sodium azide, nitrogen values are provided to the soil. Exemplary of organic herbicides capable of being metabolized by soil micro-organisms is isopropyl N-(3-chlorophenyl) carbamate.

5 Claims, No Drawings

METHOD OF CONTROLLING WEEDS WITH A COMBINATION OF ISOPROPYL N-(3-CHLOROPHENYL)-CARBAMATE AND SODIUM AZIDE

CROSS-REFERENCE TO RELATED APPLICATIONS

This application is a continuation of U.S. application Ser. No. 755,765, filed Aug. 26, 1968, now abandoned which is a continuation of U.S. application Ser. No. 632,478, filed Feb. 13, 1967, now abandoned, which is a division of U.S. application Ser. No. 400,216, filed Sept. 29, 1964, now U.S. Letters Pat. No. 3,376,125, issued Apr. 2, 1968.

This invention relates to sodium azide. More specifically, this invention relates to the use of sodium azide as an agricultural chemical.

Sodium azide may be used either alone or in combination with other chemical compounds to kill, deactivate, or regulate the growth of organisms, for example, plants, fungi, and soil micro-organisms, e.g., bacteria. Sodium azide is also employed according to this invention as a nitrogen source for crop plants. Thus in the preferred embodiment of this invention, a single application of sodium azide provides both pesticidal and fertilizing benefits to the soil.

Sodium azide is a crystalline solid which is readily soluble in water and is stable at all temperatures up to its melting point (300°C.). Aqueous solutions ranging from the most dilute to saturated are also very stable. Solutions containing 250 grams of sodium azide and 750 grams of water, for example, have been stored in sealed containers at room temperatures for periods in excess of a year without significant decomposition.

Apparently, dissolved sodium azide ionizes to sodium and azide ($N_3$) ions. When silver, copper, or lead ions, for example, are introduced into an aqueous solution of sodium azide, the corresponding azide, i.e., silver azide, copper azide, or lead azide, respectively, is precipitated. The precipitation is quantitative even in very old solutions, i.e., all of the azide introduced into the solution as sodium azide is precipitated out of solution in the form of, for example, silver azide.

Because of the stable nature of sodium azide in solid form and aqueous solution, it is surprising and unexpected that moistened solid sodium azide (or aqueous solution of sodium azide) brought into contact with soil (or other media containing micro-organisms commonly found in the soil) readily decomposes thereby providing nitrogen in a form available to plants. It is believed that soil micro-organisms capable of decomposing sodium azide are normally present in the air. Thus they tend to migrate from the air to surfaces, media and implements associated with agriculture such as non-soil seed beds, e.g., vermiculite, sawdust, straw, gravel, etc., harvested or growing crop plants or plant parts and storage containers.

The time required for sodium azide to decompose when contacted with moistened soil (or other microorganism bearing media) is dependent upon many factors, e.g., the quantity of azide applied per unit area, the population density of the soil micro-organism responsible for its decomposition, and the temperature, moisture and composition of the soil (or other media). Sodium azide applied in accordance with the various embodiments of this invention decomposes substantially completely in a few days to a few weeks, rarely in excess of 30 days after application to the soil. Typically sodium azide applied to the soil in rates of about 2 to about 500 pounds per acre decomposes completely within about 3 to about 15 days after application to the soil.

Frequently pesticides decompose into products which are detrimental to plant life, particularly crop plants. By contrast, the decomposition products of sodium azide are normally harmless to plant life in nonalkali soils. In alkali soils, i.e., soils in which excessive amounts of sodium (usually called "exchangeable" or "absorbed" sodium) have replaced calcium and magnesium in the soil colloids, it is often desirable to employ with sodium azide applications soil amendments to combat alkali conditions of the soil. Such amendments are well known and include sulfur, sulfur dioxide, sulfuric acid, gypsum, iron sulfate, and aluminum sulfate.

As the sodium azide remains in contact with the soil, it is decomposed probably by microbial and chemical agents in the soil, to form sodium and nitrogen containing products. The nitrogen containing products are all or partly available as plant food. Neither the sodium nor nitrogen containing products possess the biological toxicity of the sodium azide. Thus in the preferred embodiment of this invention, sodium azide is employed to cleanse the soil of undesirable organisms. Typically, the sodium azide is applied prior to planting seeds in the treated area. Seeds are planted prior to reestablishment of the undesirable organisms in the soil but subsequent to the decomposition of sodium azide into plant food. In this fashion, sodium azide is utilized both as a herbicide and as a fertilizer. It is within contemplation that the azide be applied subsequent to planting, either pre- or post emergence of the crop plants.

Sodium azide is very soluble in water. Twenty-eight per cent sodium azide by weight basis the solution may be dissolved in water at 10°C. At 40°C. a solution containing up to about 50 percent by weight sodium azide, basis the solution, is conveniently prepared. Sodium azide solutions may be stored and used in vessels of mild steel, stainless steel, or nickel, for example, for time periods normally required in agricultural practice without significant reaction between the azide solution and the material in the container. Thus, in all the embodiments described herein, sodium azide is often conveniently applied in aqueous solution. Other methods of application are within the scope of this invention. Sodium azide may also be applied to soil, wrappers, containers, or directly to plants in the form of, for example, crystals, granules, or finely comminuted dry dust. It is sometimes convenient to mix solid sodium azide with a wettable powder of water-insoluble pesticide, e.g., 2-4-dichlorophenoxyacetic acid. The mixture, containing from less than 1 to in excess of 90 percent by weight azide, is conveniently mixed in aqueous media prior to application.

Sodium azide may be ground to a very fine powder size, usually minus 100 mesh, and applied as a dust. It is usually desirable to dilute the azide with an inert diluent such as silica, clay, talc, bentonite, diatomaceous earth, wood flour, etc. Good distribution of the azide is usually facilitated by diluting the azide with up to in excess of 99 percent inert dust. Sometimes formulations containing about 5 to about 25, rarely in excess of 30, percent azide are useful. Another effective method of diluting sodium azide for solid application is to supply the azide as an absorbed ingredient on granules of inert material, for example, attapulgite clay, corn cobs, sawdust, bentonite, walnut shells, etc. The azide may also be absorbed or coated on other pesticides, pesticide-containing granules, or fertilizers, especially natural fertilizers such as manures, activated sludge, etc. Sodium azide is usually present in these granules, etc., in amounts of less than 25 percent by weight basis the granules including all absorbed constituents. Although much greater proportions are possible and within contemplation, the sodium azide content of these granular products typically ranges from about 1 per cent to about 20 per cent, most often about 2 percent to about 10 percent.

Sodium azide is frequently advantageously applied in combination with other herbicides, nematocides, defoliants, fungicides, bactericides, and similar pesticides. The azide often extends the activity of these other pesticides by deactivation of the soil organisms that decompose (typically by metabolizing) the pesticides. The combination of sodium azide with one or more of these pesticides is often synergistic in effect. Thus, a broader spectrum of undesirable organisms is affected by the combination than by the individual components. In addition the effectiveness of the combination against a particular undesirable organism often exceeds the sum of the effects of the individual component. Sodium azide may be present in the combination in amounts from about 1 to in excess of 90 per cent by weight. Recommended proportions are from about 1 to about 30, typically less than 20, rarely in excess of 70 percent by weight sodium azide, basis the combination.

One particularly noteworthy embodiment of this invention is the application of sodium azide in a granule coated with a semi-permeable film. Other pesticides, plant food, ingredients, etc., may be included in the granule. An example of the granule contemplated by this embodiment is a 15/30 mesh attapulgite clay granule impregnated with isopropyl N-(3-chlorophenyl) carbamate and sodium azide and coated with a thin film of polymerized drying oil. The film on the granule allows only slow vaporization of the carbamate from the granule. In addition, the film allows minimal contact of soil microorganisms with the carbamate and the azide in the granule. The azide deactivates organisms penetrating the film before they can metabolize the carbamate. Eventually, all of the carbamate escapes from the granule. Soil micro-organisms and moisture penetrating the film eventually decompose the azide in the granule. Thus after first protecting the carbamate from attack by soil micro-organisms, the azide provides nitrogen to the soil. The carbamate and azide may each be present in the granule in any convenient amount, i.e., about 5 to about 25 per cent by weight basis the granule. The film coating is of any material which physically allows a slow release of the pesticide, e.g., carbamate vapors. Examples of such materials are acrylic resins, e.g., polymethylmethacrylate, vinyl resins, e.g., polyvinylacetate, and drying oils, e.g., linseed oil, soybean oil, safflower oil, castor oil, tung oil, and fish oils. These drying oils are often semi-oxidized when they are applied to the granule.

The following example illustrates the manner in which the invention may be practiced.

EXAMPLE I

An assortment of weed seeds, including pigweed, barnyard grass, Kochia and carbgrass were placed in approximately equal amounts in 6 inch petri dishes which contained two pieces of filter paper saturated respectively with 10 cc's of 20 parts per million by weight aqueous solution of isopropyl N-phenylcarbamate (IPC), isopropyl N-(3-chlorophenyl)carbamate (CIPC), sodium azide, and a water control. The petri dishes were kept in the dark at 80° to 85°F. Each dish had its own glass cover. 5 days after treatment, it was noted that the seeds were growing well in the water control. The seeds treated with IPC evidenced some stunting. The seeds in the dish treated with CIPC evidenced marked stunting. The seeds treated with sodium azide exhibited no growth. Ten days after treatment, 10 cc's of water was added to each dish. Fifteen days after treatment the seeds which had been treated with IPC and CIPC exhibited stunted growth compared to the water treated control. The seeds treated with sodium azide showed better growth than those treated with water.

Although the instant invention has been described with particular reference to specific embodiments and examples, it is not intended thereby to limit the scope of this invention except insofar as specific limitations are recited in the claims.

1. In the method of controlling weeds by applying to the soil a herbicidal amount of isopropyl-N-(3-chlorophenyl)-carbamate, the improvement comprising applying to the soil an amount of sodium azide sufficient to kill said micro-organisms thereby both extending the soil life of said organic herbicide and, upon decomposition of the sodium azide, providing nitrogen values to said soil.

2. The method of claim 1 wherein the amount of said sodium azide applied to said soil is in the range of from about 1 to about 30 percent by weight basis the organic herbicide and sodium azide applied to said soil.

3. The method of claim 1 wherein said sodium azide is applied to said soil in the form of a granule comprising sodium azide and an inert solid material.

4. The method of claim 3 wherein said inert solid material is attapulgite clay.

5. The method of claim 4 wherein said attapulgite clay is impregnated with said isopropyl N-(3-chlorophenyl)carbamate and said sodium azide and coated with a thin film of polymerized drying oil.

* * * * *